Dec. 10, 1957     J. C. MAJORS     2,815,732
ALIGNING INDICATOR FOR THE HITCH MEANS ON A TRAILER
AND TOWING VEHICLE
Filed Oct. 26, 1956
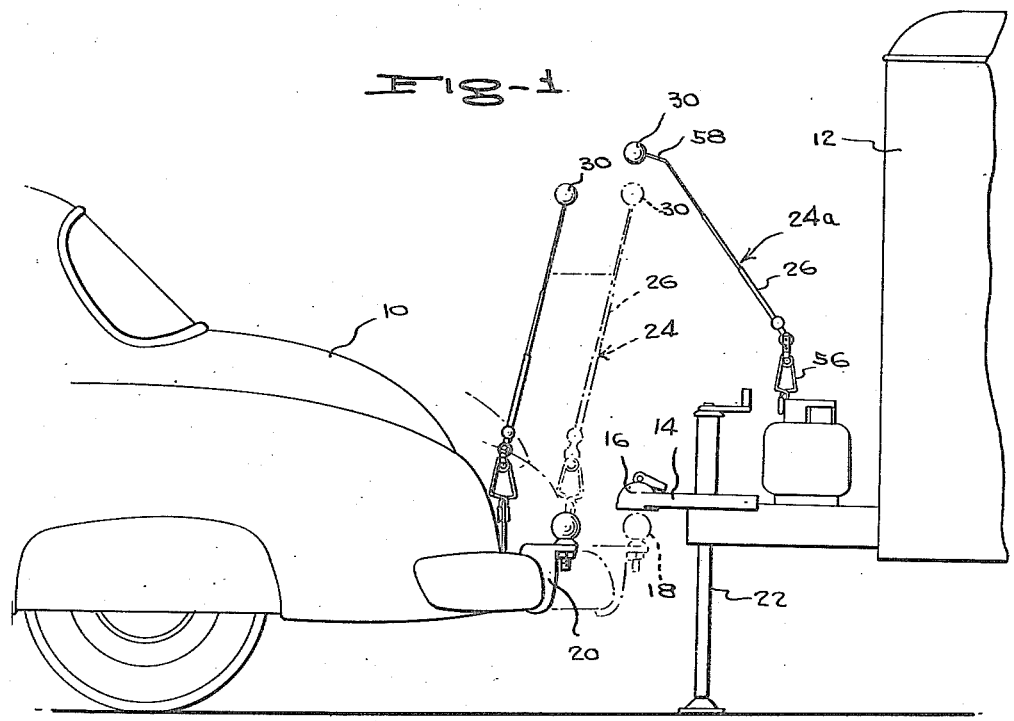
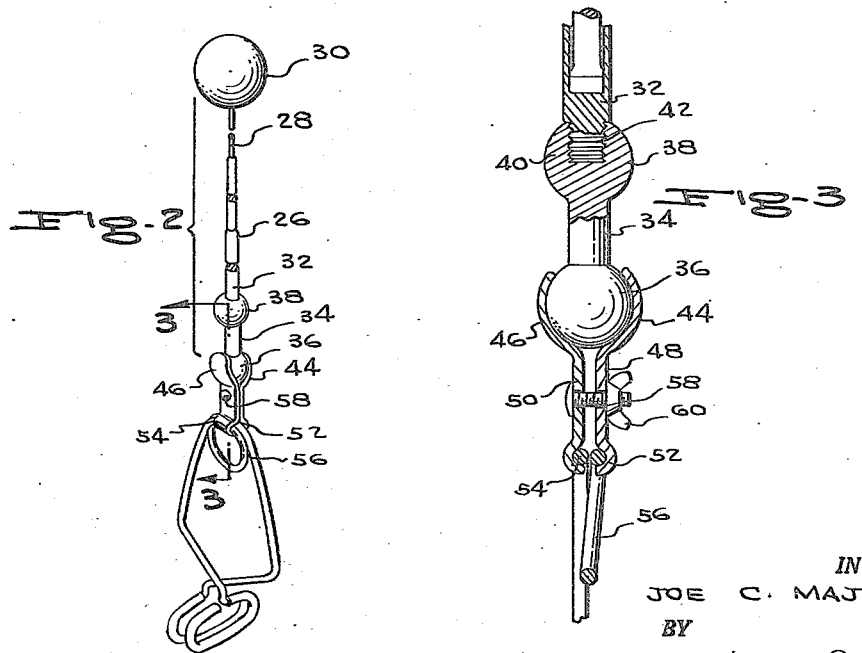
INVENTOR.
JOE C. MAJORS, SR.
BY
McMorrow, Berman & Davidson
ATTORNEYS United States Patent Office
2,815,732
Patented Dec. 10, 1957

2,815,732

ALIGNING INDICATOR FOR THE HITCH MEANS ON A TRAILER AND TOWING VEHICLE

Joe C. Majors, Texarkana, Tex.

Application October 26, 1956, Serial No. 618,537

3 Claims. (Cl. 116—28)

This invention appertains to improvements and means for enabling one person to couple the hitch means on a trailer with the companion hitch means on a towing vehicle by backing the towing vehicle into proper alignment with the trailer.

A primary object of the present invention is to provide means which is mounted on the towing vehicle and on the trailer in such relation with the hitch means so as to visibly indicate to the driver of the towing vehicle whether he is backing up into correct alignment with the trailer and to visibly indicate when the towing vehicle is in correct position with the trailer so that the hitch means are in the exact position for engagement to couple the trailer to the towing vehicle.

Another object of the present invention is to provide a simple indicator means, which is detachably affixable to the rear of a towing vehicle and to the front of a trailer, such indicating means on the towing vehicle being formed to cooperate with the indicating means on the trailer so that, in a certain relationship of the two indicating means, the operator of the towing vehicle is apprised of the fact that the hitch means are in the correct position for coupling.

Generally stated, the present invention comprehends the provision of a telescopic aerial, which is attached to the rear of the towing vehicle, for example, a car, so that it extends upwardly and rearwardly from the rear end of the towing vehicle. The aerial terminates at its upper end in a suitable indicator. Cooperating with the aerial on the rear end of the towing vehicle is a similar aerial, which is detachably affixable to the front end of the trailer and which terminates at its upper end in a similar indicator. The indicator on the aerial, which is attached to the trailer, is positioned so that it extends forwardly of the hitch means and overlies the hitch means on the trailer. The indicator on the aerial for the vehicle extends outwardly and rearwardly from the hitch means on the vehicle and is in alignment therewith. Thus, when the indicator means on the vehicle aerial is positioned so that it underlies the indicator means on the trailer aerial, the hitch means on the trailer and on the vehicle will be in proper and correct position for coupling.

The foregoing and ancillary objects are attained by this invention, the preferred embodiment of which is set forth in the following description and illustrated in the accompanying drawing, wherein:

Figure 1 is a side elevational view of the rear portion of a vehicle and the front portion of a trailer, the trailer having a hitch means which is adapted to be coupled with a complementary hitch means on the vehicle, and illustrating the complementary indicator means on the vehicle and on the trailer in elevation;

Figure 2 is a perspective view of the aligning indicator; and

Figure 3 is an enlarged detailed vertical sectional view taken on line 3—3 of Figure 2.

Referring now more particularly to the accompanying drawings, the numeral 10 generally designates a towing vehicle, while the numeral 12 designates a trailer. The trailer 12 has a forwardly extending tongue 14 which terminates in a socket 16 that is adapted to be coupled to a ball 18 on a towing arm 20, which is attached to the rear of the vehicle 10. A post assembly 22 is provided on the forward end of the trailer to support the weight of the front end of the trailer when the trailer is not supported by the vehicle 10.

In accordance with the present invention, means is provided for indicating to the driver of the vehicle, engaged in backing the vehicle toward the trailer, when the ball 18 underlies the socket 16, so that the post assembly can be lowered to engage the socket with the ball and couple the trailer to the vehicle. The means includes an indicator means 24 mounted on the rear of the vehicle and a complementary indicator means 24a mounted on the front end of the trailer. Both of the indicator means are identically constructed, except for a slight difference in the upper end, as will be described.

The indicator means, as shown in detail in Figures 2 and 3, includes an aerial 26, which is composed of a telescopic shafting. The uppermost section 28 terminates in an enlargement 30, which is preferably spherical in shape. The lowermost section 32 of the shafting is socketed in the upper end of a universal connection 34. The universal connection 34 includes a lower ball 36 and an upper ball 38, the latter being provided with an internally threaded bore 40, in which the reduced threaded end 42 of the lowermost section 32 is threaded. The ball 36 is fitted in a split socket 44, which is formed by arcuate upper ends 46 on a pair of vertically disposed straps 48 and 50. The straps 48 and 50 have lower U-shaped ends 52, which are disposed in confronting relation and which are adapted to be clamped on the coiled web portion 54 of a spring clip 56. The arms 48 and 50 are secured together by a bolt 58 and a wing nut 60, so as to clamp the ends 52 and 54 on the spring clip and to clamp the split socket on the ball 36. In the indicator means 24, the shafting 26 is disposed so that it extends upwardly and rearwardly from the vehicle.

With respect to the use of the indicator means, as shown in Figure 1, the spring clip 56 is attached to the car license bracket, trunk handle, bumper or some similar supporting structure of the vehicle and is positioned so that the shafting 26 of the indicator means 24 is in longitudinal alignment with the ball 18 and so that the enlargement 30 is positioned forwardly of and above the ball. The enlargement 30 is visible through the rear window of the vehicle 10. The spring clip 56 of the indicator means 24a of the trailer may be attached to the butane bottle holder on the trailer, as shown in Figure 1, or may be attached to the frame, jack hoist or any other portion of the vehicle. The shafting 26 of the indicator means 24a extends at a greater angle from the spring clip than does the shafting 26 of the indicator means 24. In this respect, the upper section 58 of the indicator means 24a is bent at an obtuse angle to the shafting 26, so that the enlargement 30 is disposed in a substantially horizontal position for the purpose of overlying the enlargement 30 on the indicator means 24. In this respect, it will be noted that the enlargement 30 is adapted to underlie the enlargement 30 on the indicator means 24a when the ball 18 underlies the socket 16.

It can be readily seen that the enlargement 30 on the indicator means 24 and the enlargement 30 on the indicator means 24a will be clearly visible to the driver of the car as he is backing the car up towards the trailer 12. When the enlargement 30 of the indicator means 24 underlies the enlargement 30 of the indicator means 24a, the operator of the car immediately realizes that the ball 18 is correctly positioned under the socket 16.

While the preferred form of this invention has been

What is claimed is:

1. In combination with a towing vehicle having one component of a hitch means on its rear end and a trailer having another component of the hitch means on its front end; visual indicator means for visually indicating when the components of the hitch means are in vertical alignment as the towing vehicle is backed toward the front of the trailer; said means including a first member attached to the rear portion of the towing vehicle and extending upwardly above the hitch component on the towing vehicle and having an upper end provided with a visual indicator disposed above the hitch component on the towing vehicle and in vertical alignment therewith, said indicator being disposed at a height so as to be visible through the rear window of the towing vehicle to a driver seated in a driving position and a second member attached to the trailer and extending upwardly above the hitch component on the trailer and having an upper end provided with a second visual indicator disposed above the hitch component on the trailer in vertical alignment therewith and disposed at a height above the first indicator, so that said second visual indicator will overlie the first visual indicator and be in vertical alignment therewith when the hitch components are located in vertical alignment for interconnection, said indicators and hitch components being located, at such time, one above the other so that a vertical line will pass through the hitch components and the visual indicators.

2. The combination of claim 1, wherein said members include elongated shafting having lower ends universally connected to a resilient clamping means and said indicators include bulbous enlargements provided on the upper ends of the shafting.

3. A visual indicator means for the hitch means for a trailer or towing vehicle, comprising a first elongated shafting having an upper and a lower end, resilient clamping means provided on the lower end for detachably fastening the shafting in a substantially vertical position on the towing vehicle and an enlarged projection provided on the upper end and positioned by the shafting in a position vertically overlying and in vertical alignment with the hitch means on the towing vehicle, said shafting being of a length to dispose the projection at a height visible to a driver in a driving position in the towing vehicle and a second elongated shafting having an upper and a lower end, resilient clamping means provided on the lower end for detachably fastening the shafting in a substantially vertical position on the trailer and an enlarged projection provided on the upper end and positioned by the shafting in a position vertically overlying and in vertical alignment with the hitch means on the trailer, said projections being adapted to be in overlying, vertical alignment when the hitch means are in vertical alignment so that a vertical line will pass through the projections and the hitch means.

References Cited in the file of this patent

UNITED STATES PATENTS

| | | |
|---|---|---|
| 2,121,317 | Cohen | June 21, 1938 |
| 2,324,614 | Dalton | July 20, 1943 |
| 2,736,885 | Thompson | Feb. 28, 1956 |

FOREIGN PATENTS

| | | |
|---|---|---|
| 706,200 | Great Britain | Mar. 24, 1954 |